TELEVISION RECEIVER MECHANICAL SUBASSEMBLY

Filed June 1, 1954 2 Sheets-Sheet 1

INVENTORS.
JOHN R. EBBELER.
EDWARD C. WALLBRECH.
BY Alden D. Redfield
Charles M. Hogan.
ATTORNEYS.

INVENTORS.
JOHN R. EBBELER.
EDWARD C. WALLBRECH.
BY Alden D. Redfield
Charles M. Hogan
ATTORNEYS.

United States Patent Office 2,800,620

Patented July 23, 1957

2,800,620

TELEVISION RECEIVER MECHANICAL SUBASSEMBLY

John R. Ebbeler and Edward C. Wallbrech, Cincinnati, Ohio, assignors to Avco Manufacturing Corporation, Cincinnati, Ohio, a corporation of Delaware Application June 1, 1954, Serial No. 433,688

4 Claims. (Cl. 321—8)

The present invention relates generally to television receivers and, more particularly, to horizontal output circuits incorporating the flyback system of high-voltage power supply. The invention contemplates the provision of a novel mechanical assembly for a television receiver, featuring, in structural and electrical combination, a horizontal output transformer, a rectifier tube and socket for same, and a supporting and integrating framework. The principal object of the invention is to provide a simple, economical, easily manufactured, conveniently serviced horizontal output transformer-rectifier combination.

For a better understanding of the invention, together with further objects and advantages thereof, reference is made to the following detailed description of the accompanying drawings, in which:

Figs. 1, 2, 3, and 4 are, respectively, front elevational, top plan, bottom, and right side elevational views of a transformer-rectifier combination in accordance with the invention;

Figures 3, 4, 5, 6:
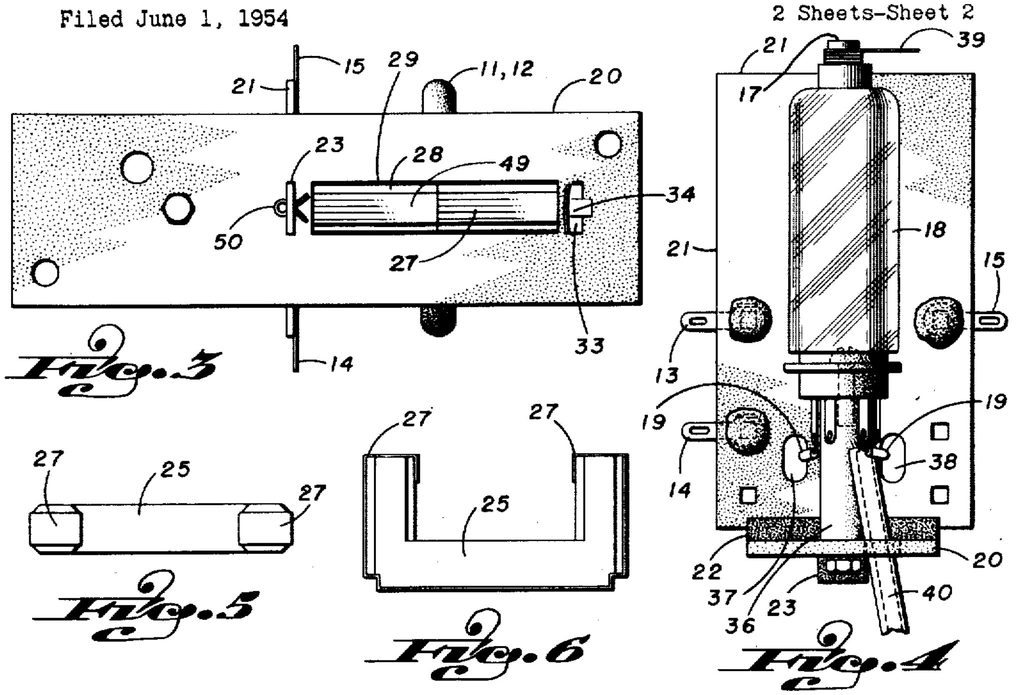
Figs. 5 and 6 are end and side views, respectively, of one of the core pieces included in the embodiment shown.
Figure 7:
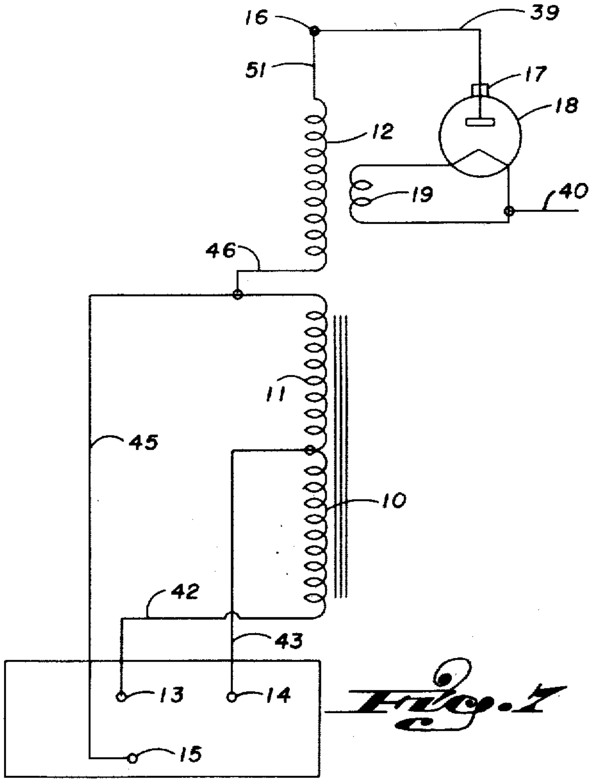
Fig. 7 shows a typical output circuit in which the invention may be used.

Reference is made to the copending patent application of William H. Myers, Serial No. 430,875, entitled "Television Receiver Construction," filed in the United States Patent Office May 19, 1954, and assigned to the same assignee as the present application and invention—specifically to Figs. 6 and 14 thereof, for a general description of a television receiver in which an output transformer-rectifier combination in accordance with the invention is used. It will be seen that Fig. 7 herein corresponds generally to the horizontal output transformer-rectifier circuit there shown. In Fig. 7 of the present application is an iron core type of auto-transformer comprising serially connected windings 10, 11, and 12. Winding 10 is coupled to a horizontal deflection yoke (not shown), and its leads are brought out to terminals 13 and 14. The leads of winding 11 are brought out to terminals 14 and 15, and those of winding 12 are brought out to terminals 15 and 16. Terminal 16 is connected to the anode or cap terminal 17 of a high-voltage rectifier tube 18, the filament of which is powered from a secondary winding 19.

In accordance with the invention we provide a novel mechanical subassembly suitable to provide this circuitry. This subassembly is a horizontal output transformer-rectifier combination comprising the elements now described. First there is provided a base member 20 of insulating material which may conveniently be mounted on the receiver chassis (not shown). Disposed at right angles to the base member is a divider and terminal board member 21, also made of insulating material. The lower edge of the divider is supported by a soft rubber spacer 22, and the divider is formed with an integral extension 23 which projects through a slot in the base 20, the divider and base being secured in assembly by a cotter pin 50.

Figures 1, 2:
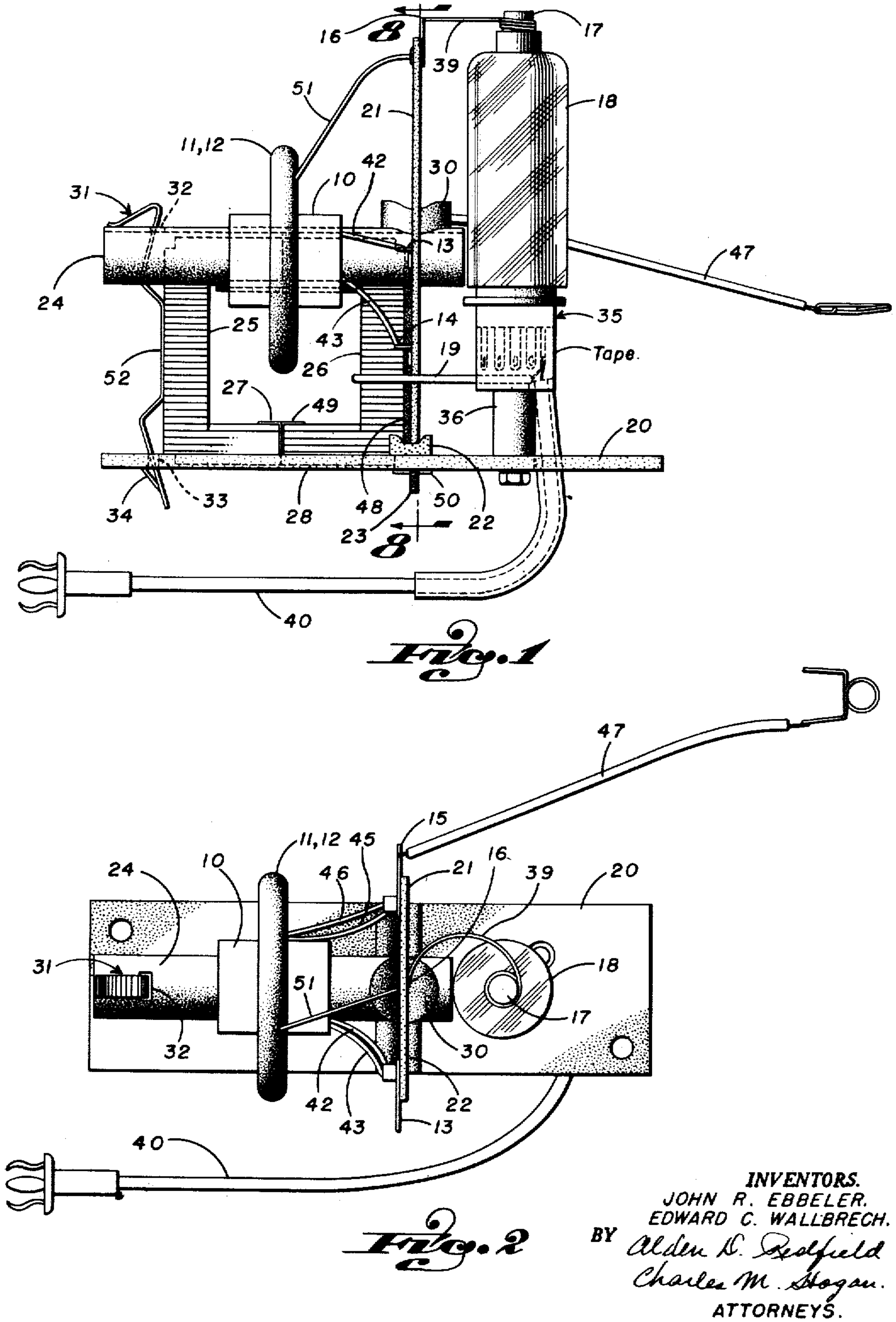

On one side of the divider 21 there is mounted the horizontal output transformer. It comprises a generally cylindrical coil form 24. Two C-shaped core members 25 and 26 are disposed with abutting ends to provide a magnetic circuit, as best shown in Fig. 1. These core members are made of a suitable magnetic material, and the abutting ends of each are taped, as shown at 27, in order to provide air gaps in the magnetic circuit. The lower leg of each core member is formed with a reduced portion such as 28, for example, which fits within an aperture 29 in the base 20, in order to secure rigidity of assembly. A spacer 48 of insulating material is placed between core member 26 and divider 21, and the spacer is readily secured in place by tape 49 for core member 26, tape 49 corresponding to tape 27.

Figure 8:
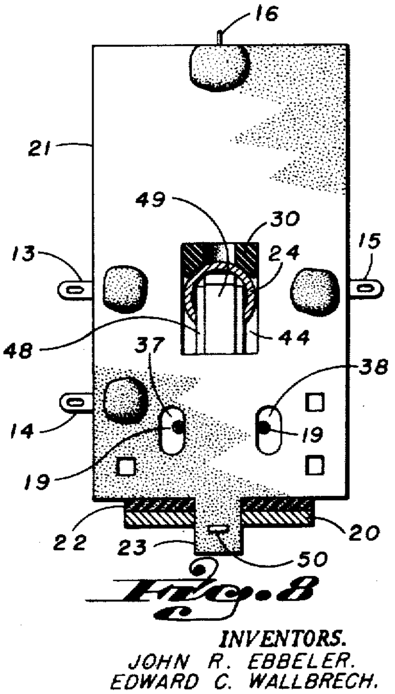
Fig. 8 is an elevational sectional view taken along the section line 8—8 of Fig. 1 and looking in the direction of the arrows.

One leg of each of the core members 25 and 26 projects into the coil form 24, the ends of the coil form being axially slotted (Fig. 8) to enhance the assembly. One end of the coil form 24 projects into an aperture 44 formed in divider 21, and the coil form is secured to the divider by a compressed washer of soft material 30. The base member and coil and the magnetc core members are locked together by a metallic leaf spring 31 which projects through an opening 32 in the other end of coil form 24 and terminates at the top in a bent-back portion. The spring 31 has a generally bowed mid portion 52 which abuts core member 25 and biases the core members into compression. The spring also passes through an opening 33 in the base 20 and is secured in place by an integral resilient tang 34.

Disposed on the other side of the divider 21 is a rectifier tube 18, mounted on a socket 35, the socket in turn being disposed on a post 36 secured to base member 20. A filament supply loop 19 projects through ports 37 and 38 in the divider 21 and around the core member 26. The cap 17 of the rectifier tube is connected to terminal 16 by a conductor 39, and terminal 16 is connected to winding 12 by conductor 51 to complete the secondary circuit of the high-voltage rectifier.

The filament supply loop 19 is connected to the filament terminals of the socket 35. The high voltage anode connection to the picture tube is shown at 40.

The auto-transformer windings 10, 11, and 12 are concentric, 10 being the inner winding of somewhat greater width than the windings 11 and 12, 11 being the central winding and 12 being the outer winding, the windings 11 and 12 being of the pi type. Winding 10 is placed directly on coil form 24. Winding 10 is connected by conductors 42 and 43 to the terminals 13 and 14, respectively. Windings 11 and 12 are connected to terminal 15 by conductors 45 and 46, respectively. A conductor 47 is provided to connect terminal 15 to the power amplifier tube (not shown).

It will be seen that the divider 21 provides a terminal board both for the rectifier tube and the horizontal output transformer. The base member 20 and divider 21 provide a unitary mounting both for the transformer and the rectifier. Winding 19 is conveniently utilized as a filament supply.

While there has been shown and described what is at present understood to be the preferred embodiment of the present invention, it will be understood by those skilled in the art that various modifications and changes may be made therein without departing from the scope of the invention as defined by the appended claims.

We claim:

1. In a television receiver, an output transformer-rectifier combination comprising: first, a base member of insulating material having a longitudinal slot formed therein, a divider and terminal-board member of insulating material formed with a central aperture and secured at right angles to the base member, an output transformer disposed on one side of said divider and comprising a cylindrical coil form and two C-shaped core members and transformer windings concentrically wound on said coil form, said core members being disposed with taped abutting ends forming air gaps, with one leg of each having a reduced portion projecting into said slot to interlock with said base and with one leg of each projecting into said coil form, the ends of said coil form being slotted and one end projecting into the aperture in said divider, washer means in compression between said end and the top wall of said aperture for securing said coil form to said divider, and a leaf spring having end portions projecting into said base member and the other end of said coil form for locking together the base and coil form and core members; and, second, a rectifier tube and socket mounted on said base, a filament-supply loop projecting from said socket through said divider and around one of said core members, and means for securing leads from the windings and the rectifier tube to the divider, so that the divider provides a terminal board for both the tube and the windings.

2. In a television receiver, and output transformer-rectifier combination comprising: first, a base member of insulating material, a divider and terminal-board member of insulating material formed with a central aperture and secured at right angles to the base member, and output transformer disposed on one side of said divider and comprising a cylindrical coil form and two C-shaped core members and transformer windings concentrically wound on said coil form, said core members being disposed with taped abutting ends forming air gaps, with one leg of each secured to said base and with one leg of each projecting into said coil form, the ends of said coil form being slotted and one end projecting into the aperture in said divider, means for securing said end of said coil form to said divider, and means for locking together the base and coil form and core members, said locking means comprising a leaf spring bowed to bias one of said core members toward said divider and having end portions projecting through said base member and the other end of said coil form; and, second, a rectifier tube and socket mounted on said base, a filament-supply loop projecting from said socket through said divider and around one of said core members, and means for securing leads from the windings and the rectifier tube to the divider, so that the divider provides a terminal board for both the tube and the windings.

3. In a television receiver, an output transformer-rectifier combination comprising: first, a base member, a divider and terminal-board member of insulating material formed with an aperture and secured at an angle to the base member, an output transformer disposed on one side of said divider and comprising a cylindrical coil form and two C-shaped core members and transformer windings concentrically wound on said coil form, said core members being disposed with taped abutting ends forming air gaps, with one leg of each secured to said base and with one leg of each projecting into said coil form, one end of said coil form projecting into said aperture, and means secured to the other end of said coil form for locking together the base and coil form and core members; and, second, a rectifier tube and socket mounted on said base and means for securing leads from the windings and the rectifier tube to the divider, so that the divider provides a terminal board for both for both the tube and the windings.

4. In a television receiver, an output transformer-rectifier combination comprising: first, a base member of insulating material, a divider and terminal-board member of insulating material secured at right angles to the base member, an output transformer disposed on one side of said divider, and means for locking said transformer to said base member and said divider; and, second, a rectifier tube and socket mounted on said base, a filament-supply loop projecting from said socket through said divider and around the core of said transformer, and means for securing leads from the transformer and the rectifier tube to the divider, so that the divider provides a terminal board for both the tube and the transformer while positioning said loop and locking with said transformer.

References Cited in the file of this patent

UNITED STATES PATENTS

| | | |
|---|---|---|
| 2,568,486 | Cage | Sept. 18, 1951 |
| 2,601,153 | Knight | June 17, 1952 |
| 2,612,545 | Gray | Sept. 30, 1952 |

UNITED STATES PATENT OFFICE

CERTIFICATE OF CORRECTION

Patent No. 2,800,620 July 23, 1957

John R. Ebbeler et al.

It is hereby certified that error appears in the printed specification of the above numbered patent requiring correction and that the said Letters Patent should read as corrected below.

Column 3, lines 25 and 29, for "and output", each occurrence, read -- an output --.

Signed and sealed this 1st day of October 1957.

(SEAL)
Attest:
KARL H. AXLINE
Attesting Officer

ROBERT C. WATSON
Commissioner of Patents